(12) United States Patent
Ponsford et al.

(10) Patent No.: US 8,836,570 B2
(45) Date of Patent: Sep. 16, 2014

(54) SYSTEMS AND METHODS FOR EXTENDING MARITIME DOMAIN AWARENESS BY SHARING RADAR TRACKS BETWEEN VESSELS

(71) Applicant: Raytheon Canada Limited, Ottawa (CA)

(72) Inventors: Anthony M. Ponsford, Ottawa (CA); Peter Scarlett, Elora (CA); Gregory D. Westfall, Waterloo (CA)

(73) Assignee: Raytheon Canada Limited, Ottawa, Ontario (CA)

( * ) Notice: Subject to any disclaimer, the term of this patent is extended or adjusted under 35 U.S.C. 154(b) by 102 days.

(21) Appl. No.: 13/658,422

(22) Filed: Oct. 23, 2012

(65) Prior Publication Data
US 2014/0210658 A1 Jul. 31, 2014

Related U.S. Application Data

(60) Provisional application No. 61/551,654, filed on Oct. 26, 2011.

(51) Int. Cl.
*G01S 13/93* (2006.01)
(52) U.S. Cl.
CPC .................. *G01S 13/9307* (2013.01)
USPC ................ 342/41; 340/984; 701/21
(58) Field of Classification Search
CPC ........... G08G 3/00; G08G 3/02; G08G 13/93; G08G 13/9307
USPC ........................ 342/41; 340/984; 701/21, 301
See application file for complete search history.

(56) References Cited

U.S. PATENT DOCUMENTS

| 7,817,079 | B1 | 10/2010 | Funk |
| 2006/0129288 | A1* | 6/2006 | Yanagi ............................ 701/21 |
| 2008/0086267 | A1 | 4/2008 | Stolte et al. |
| 2009/0079590 | A1* | 3/2009 | Hiraoka ........................ 340/984 |
| 2009/0207020 | A1* | 8/2009 | Garnier et al. ................ 340/541 |

(Continued)

FOREIGN PATENT DOCUMENTS

| GB | 2 414 356 A | 11/2005 |
| GB | 2430322 A | * 3/2007 |

(Continued)

OTHER PUBLICATIONS

Notification of Transmittal of the International Search Report and the Written Opinion of the ISA for PCT/CA2012/000973 dated Jan. 13, 2013.

(Continued)

*Primary Examiner* — John B Sotomayor
(74) *Attorney, Agent, or Firm* — Daly, Crowley, Mofford & Durkee, LLP

(57) ABSTRACT

A system for extending maritime domain awareness of participating vessels. The system includes a domain extension device installed on each of the vessels, the domain extension devices including at least one processor configured to receive own-ship radar track data from a navigational radar indicative of detectable targets located within a detection range of the radar, receive own-ship location values from a positioning device indicative of a geographical location of the vessel when the radar track data is generated, interface with a transceiver to receive other-ship radar track data and associated other-ship location values from one or more other participating vessels within a communication range of other-ship AIS transceivers, generate a common operating picture based upon the own-ship radar track data, own-ship location value, other-ship radar track data and other-ship location values.

31 Claims, 4 Drawing Sheets

(56) References Cited

U.S. PATENT DOCUMENTS

| | | | |
|---|---|---|---|
| 2009/0271054 A1* | 10/2009 | Dokken | 701/21 |
| 2010/0153013 A1* | 6/2010 | Kondo et al. | 701/301 |
| 2011/0022316 A1* | 1/2011 | Bendito Vallori | 701/301 |
| 2011/0163908 A1* | 7/2011 | Andersson et al. | 342/36 |
| 2012/0271538 A1* | 10/2012 | Lee et al. | 701/117 |
| 2013/0041523 A1* | 2/2013 | Jensen et al. | 701/1 |
| 2013/0111284 A1* | 5/2013 | English | 714/724 |
| 2014/0085004 A1* | 3/2014 | Mitchell et al. | 330/278 |
| 2014/0111368 A1* | 4/2014 | Lee et al. | 342/41 |

FOREIGN PATENT DOCUMENTS

| | | | | |
|---|---|---|---|---|
| JP | 2002372583 A | * | 12/2002 | G01S 13/93 |
| JP | 2005182539 A | * | 7/2005 | G08G 3/00 |
| JP | 2009025042 A | * | 2/2009 | |
| JP | 2013222326 A | * | 10/2013 | |
| WO | WO 2013059916 A1 | * | 5/2013 | |

OTHER PUBLICATIONS

Written Opinion of the ISA for PCT/CA2012/000978 dated Jan. 31, 2013.

International Search Report of the ISA for PCT/CA2012/000978 dated Jan. 31. 2013.

PCT International Preliminary Report on Patentability for PCT/CA2012/000978 dated May 8, 2014.

* cited by examiner

SYSTEMS AND METHODS FOR EXTENDING MARITIME DOMAIN AWARENESS BY SHARING RADAR TRACKS BETWEEN VESSELS

TECHNICAL FIELD

The embodiments herein relate to maritime domain awareness systems, and in particular to systems and methods for extending domain awareness of maritime vessels including government and commercial ships.

BACKGROUND

Globalization and increased international trade has led to an increase in maritime traffic around the world. Governments of many countries face challenges to adequately monitor maritime activity and to protect maritime resources. For example, some studies have found that 99% of the world's ocean catch is within 200 nautical miles of shore and 30% of this catch is poached. The poaching activities have been estimated to cost billions of dollars to various countries.

In addition, maritime vessels in certain locales also face threats from piracy. The International Maritime Bureau Piracy Reporting Centre reported that 326 piracy incidents have occurred in the first 8-months of 2011. In particular 186 Incidents reported for Somalia including 23 hijackings resulting in 399 hostages and 7 deaths.

Because maritime security, particularly over international shipping lanes, is an important component of a successful global economy, government vessels such as coast guard ships or naval ships are used to promote adherence with international maritime laws and customs or to assert a country's sovereignty. Due to the vastness of the operating environment and relatively small number of government vessels, it is desirable for each government vessel to be able to monitor maritime activity over a large geographical area.

Maritime domain awareness is also important to private maritime vessels, such as commercial ships and private yachts. For example, private vessels may wish to be aware of their surrounding so as to reduce risks of accidental collisions with other vessels, stationary objects or geographical features. The private vessels may also wish to monitor other targets around the vessel to detect potential pirate or terrorist activities.

Many maritime vessels, both private and public, employ some form of maritime domain awareness system to mitigate risks of being at sea Maritime vessels typically use navigational radars that detect targets within a detection range of the radar. In addition, maritime vessels over a certain displacement or of a certain class may also have an Automatic Information System (AIS) to identify and track nearby ships having the same system installed. However, the capabilities of the maritime domain awareness systems are limited. For example, if the navigational radar is used, the detection range of the radar might be limited by the horizon. Similarly, with AIS, the communication range is limited.

Accordingly, there is a need for improved maritime domain awareness systems that provides domain awareness of a larger geographical area.

SUMMARY OF SOME EMBODIMENTS

According to some aspects, there is provided a system for extending maritime domain awareness of participating vessels, each of the vessels having a shipboard navigational radar, an Automatic Identification System (AIS) having an AIS transceiver, and a positioning device installed thereon. The system includes a domain extension device installed on each of the vessels. Each of the domain extension devices includes at least one processor operatively coupled to the radar, the AIS and the positioning device. The at least one processor is configured to receive own-ship radar track data from the navigational radar indicative of detectable targets located within a detection range of the radar, receive own-ship location values from the positioning device indicative of a geographical location of the vessel when the radar track data is generated, interface with the transceiver to receive other-ship radar track data and associated other-ship location values from one or more other participating vessels within a communication range of other-ship AIS transceivers, generate a common operating picture based upon the own-ship radar track data, own-ship location value, other-ship radar track data and other-ship location values, the common operating picture including information about targets located within the detection range of the radar of the vessel and radars of the one or more other vessels, and interface with the AIS transceiver transmit own-ship radar track data and own-ship location values to one or more other participating vessels within a communication range of the own-ship AIS transceiver.

In some aspects, the system also includes at least one communication transceiver in addition to the AIS transceiver. The communication transceiver is operatively coupled to the domain extension device. The at least one processor of the domain extension device is configured to receive the other-ship radar track data and the other-ship location values using the communication transceiver from one or more other selected participating vessels within a communication range of other-ship compatible communication devices installed on the selected participating vessels, and transmit own-ship radar track data and own-ship location values using the communication transceiver to one or more other selected participating vessels within a communication range of the own-ship communication transceiver.

According to some other aspects, there is provided a domain extension device installable on a participating vessel having a shipboard navigational radar, an Automatic Identification System (AIS) having an AIS transceiver, and a positioning device. The domain extension device comprises at least one processor configured to receive own-ship radar track data from the navigational radar indicative of detectable targets located within a detection range of the radar, receive own-ship location value from the positioning device indicative of a geographical location of the vessel when the radar track data is generated, interface with the AIS transceiver to receive other-ship radar track data and associated other-ship location values from one or more other participating vessels within a communication range of other-ship AIS transceivers, generate a common operating picture based upon the own-ship radar track data, own-ship location value, other-ship radar track data and other-ship location values, the common operating picture including information about targets located within the detection range of the radar of the vessel and radars of the one or more other vessels, and interface with the AIS transceiver transmit own-ship radar track data and own-ship location values to one or more other participating vessels within a communication range of the own-ship AIS transceiver.

According to some other aspects, there is provided a domain extension device comprising at least one processor configured to receive owns ship radar track data from a navigational radar indicative of detectable targets located within a detection range of the radar; receive own-ship location values from a positioning device indicative of a geographical location of the vessel when the radar track data is generated; receive other-ship radar track data and associated other-ship location values using a shipboard transceiver, the other-ship radar track data and associated other-ship location values being from one or more other participating vessels within a communication range of other-ship transceivers; generate a common operating picture based upon the own-ship radar track data, own-ship location value, other-ship radar track data and other-ship location values, the common operating picture including information about targets located within the detection range of the radar of the vessel and radars of the one or more other vessels; and transmit own-ship radar track data and own-ship location values using the shipboard transceiver to one or more other participating vessels within a communication range of the shipboard transceiver.

According to some other aspects, there is provided a method for extending maritime domain awareness of participating vessels, each of the vessels having a shipboard navigational radar, an Automatic Identification System (AIS) and a positioning device installed thereon. The method includes the steps of receiving own-ship radar track data from the navigational radar indicative of detectable targets located within a detection range of the radar, receive own-ship location value from the positioning device indicative of a geographical location of the vessel when the radar track data is generated, interface with the AIS transceiver to receive other-ship radar track data and associated other-ship location values from one or more other participating vessels within a communication range of other-ship AIS transceivers, generate a common operating picture based upon the own-ship radar track data, own-ship location value, other-ship radar track data and other-ship location values, the common operating picture including information about targets located within the detection range of the radar of the vessel and radars of the one or more other vessels, and interface with the AIS transceiver transmit own-ship radar track data and own-ship location values to one or more other participating vessels within a communication range of the own-ship AIS transceiver.

Other aspects and features will become apparent, to those ordinarily skilled in the art, upon review of the following description of some exemplary embodiments.

BRIEF DESCRIPTION OF THE DRAWINGS

Various embodiments will now be described, by way of example only, with reference to the following drawings, in which.

DETAILED DESCRIPTION

Figure 1:
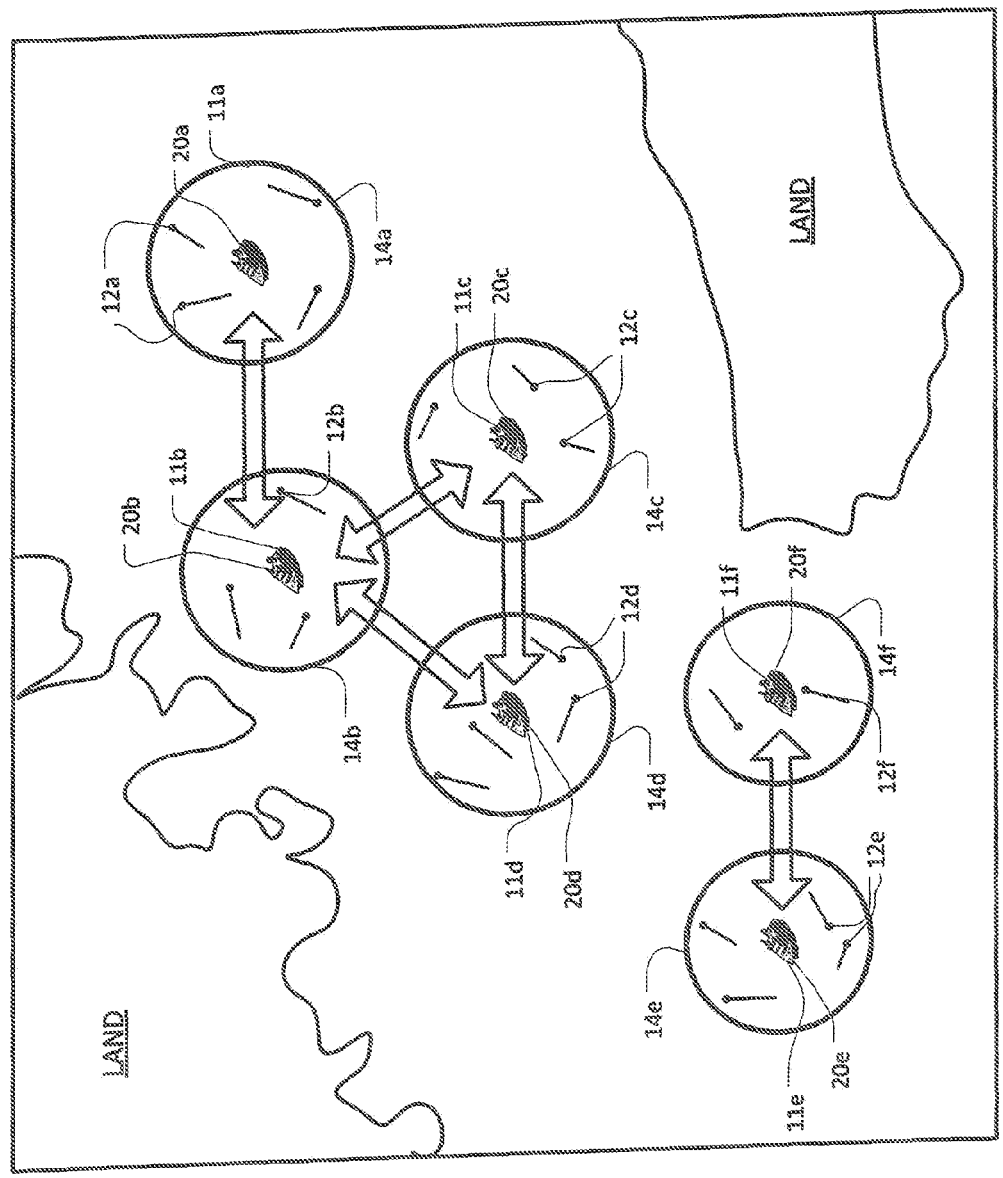
FIG. 1 is a schematic diagram a plurality of maritime vessels in a system for extending maritime domain awareness of participating vessels according to some embodiments.

The embodiments described herein relate to maritime domain awareness systems on maritime vessels. A maritime domain awareness system on a vessel generally provides navigational support by providing information about various objects of interest around the vessel such as other vessels, stationary objects or geographical features.

The navigational support system of a vessel typically includes a navigational radar for detecting various targets around the vessel using electromagnetic waves. Navigational radars are can be used to measure the bearing and distance of vessels to prevent collisions, to navigate and to fix the vessels' position at sea when within range of shore or other fixed references such as islands, buoys, and lightships. In port or in harbour, vessel traffic service radar systems are used to monitor and regulate ship movements in busy waters.

While the radar is capable of detecting bearing and speed of various targets, it is generally not capable of identifying targets. For example, the radar may not be able to distinguish between a target that is a legitimate private vessel and a target that is an illegal pirate vessel. That is, the radar would not provide information about a target vessel's identity such as its name, Maritime Mobile Service Identity (MMSI) number, and so on. To provide and receive additional information, many vessels include Automatic Identification Systems (AIS) in addition to the navigational radar.

The AIS is an automated tracking system used on vessels and by Vessel Traffic Services (VTS) for identifying and locating vessels by electronically exchanging AIS data with other nearby ships and VTS stations. The AIS includes an AIS transponder for receiving and transmuting AIS broadcasts which includes identification and other information about the vessel that is generating the broadcast. For example, the AIS broadcast may include information such as the broadcasting vessel's MMSI number, international Maritime Organization (IMO) ship identification number, radio call sign, name, navigation status, destination, and so on.

A vessel would typically use other-ship AIS broadcasts received from other vessels in conjunction with the radar track data from its own shipboard radar to generate a more comprehensive operating picture. The operating picture may be provided via a visualization system. For example, the operating picture may be provided using an electronic charting system such as an Electronic Chart Display and Information System (ECDIS), which is a computer-based navigation information system that complies with International Maritime Organization (IMO) regulations.

The usefulness of the operating picture is limited by detection limits of the radar and or broadcast range of the AIS transponders. For example, the detecting range of the radar may be limited by various factors such as signal noise, clutter, or the horizon. This would limit the operational range of the radar. Similarly, the effectiveness of the AIS is limited to the vessels that are within the communication range of the transponders.

The embodiments described herein relate to systems and methods for extending the maritime domain awareness of a vessel beyond the detection range of the radar by sharing radar track data between vessels. Sharing of radar track data between vessels involves transmitting own-ship radar track data to other vessels and receiving other-ship radar track from other vessels. The radar track data received from other vessels are processed by the receiving vessel so as to allow the receiving vessel to generate a common operating picture that may include targets that are within the radar range of the receiving vessel and the sending vessel.

Referring now to FIG. 1, illustrated therein is a system 10 for extending maritime domain awareness of vessels 11*a*-11*f* according to some embodiments. The system 10 includes maritime domain awareness systems 20*a*-20*f* installed on a plurality of maritime vessels 11*a*-11*f* for sharing radar track data and other data between the vessels 11a-11f that are within a communication range.

The maritime domain awareness system 20a according to some embodiments, which is associated with the vessel 11a will now be described with reference to FIGS. 1 and 2. The other vessels 11b-11f also have maritime domain awareness systems, 20b-20f which may be similar to or the same as the maritime domain awareness 20a.

The maritime domain awareness system 20a has a shipboard navigation radar 22 for generating own-ship radar track data indicative of detectable targets located within the detection rage of the radar 22. The radar 22 has a detection range 14a. As shown, targets 12a are located within the detection range 14a. The radar 22 generates own-ship radar track data associated with the targets 12a. The own-ship radar track data associated with the targets 12a are provided to an ECDIS 40 for visualization. The own-ship radar track data (and/or radar signals from the radar 22) is also provided to a maritime small target tracker MSTT 36 via a navigational interface 34 to detect and track small targets. The MSTT 36 is described in detail further below.

In addition to the radar 22, the system 20a on the vessel 11a also has an AIS 24 for generating and receiving AIS broadcasts. The AIS 24 has an AIS processor 28 and an AIS transceiver, which in this case is an AIS modem 26. The AIS processor 28 is configured to generate own-ship AIS reports, which include identification and navigation information about the vessel 11a. The AIS reports are provided to the AIS modern 26, which generate AIS broadcasts including the AIS reports from time to time (e.g. every 30 minutes). The AIS modem 26 also receives AIS broadcasts from other vessels that are within the communication range. As shown, the vessels 11a and 11b are within communication range of each other. The received AIS broadcasts, in this example, include other-ship AIS reports which include identification information about the vessel 11b. The AIS reports are also provided to the ECDIS 40 to supplement the radar track data provided by the radar 22 for visualization. The AIS reports are also provided to a domain extension device 38, which is described in detail further below.

In addition to the above described use, the AIS transceiver may also be used by the domain extension device 38 to send information as described below. As the AIS is mandatory for maritime vessels that meet a certain criteria, the system can be found installed on many ships around the world. The domain extension device 38 takes advantage of the existing AIS found on many vessels by using it as a communication device to transmit data to other vessels. Use of the AIS transceiver negates the need for a dedicated communication device for the subject system, which may provide significant cost savings.

The AIS reports are also provided to the ECDIS 40 to supplement the radar track data provided by the radar 22 for visualization. The AIS reports are also provided to a domain extension device 38, which is described in detail further below.

The maritime domain awareness system 20a includes a positioning device, namely, a global positioning system (GPS) 32. The GPS 32 generates a location value indicative of a geographical location of the vessel 11a when the radar track data was generated by the radar 22. The location value, for example, may include latitude and longitude values. In some embodiments, the positioning device 32 may be part of the navigation radar 22. As shown, the location value generated by the GPS 32 is provided to the ECDIS 40 (directly) and the MSTT 36 via the navigation interface 34.

In some embodiments, the positioning device 32 may be integrated within the domain extension device 38 such that it is not necessary to interface with the existing shipboard positioning device.

The MSTT 36 is an off the shelf, black-box processor that interfaces to conventional microwave navigational radar systems (e.g. the radar 22) to extend both the range and sensitivity of the host radar. That is, the MSTT supplements the radar track data generated by the radar 22 to generate a MSTT radar track picture.

The MSTT 36 was developed by Raytheon Canada Limited to detect asymmetric threats from the sea. The MSTT 36 converts existing standard navigational radars into "software definable radars" that can readily be adapted to provide optimal performance against a wide variety of targets, including smaller targets which might go undetected by the conventional radars. For example, the MSTT 36 can be operationally deployed to detect, track and classify threats such as "Go-Fasts", small boats, semi-submersibles, swimmers and so on.

The MSTT 36 utilizes industry-standard data protocols for interfacing to third party radars, information dissemination and display. The automatic radar track initiation and networking of the system allows for unattended sites with the resulting reduction of manning requirements. The MSTT 36 is designed to interface to Decision Support Systems such as Multi Source Correlator Tracker (MSCT) software from Raytheon Solipsys. The MSCT is a correlation and data fusion engine that synthesizes track, tactical data link, and sensor information from multiple dissimilar sources to precisely construct a common operating picture.

The MSTT 36 can also be readily modified to implement some of functionalities provided by the domain extension device 38. For example, the MSTT 36 includes a processor which may be configured to provide additional functionality that the domain extension device 38 provides. As shown, the MSTT 36 receives own ship radar tract data from the radar 22 and the location value from the GPS 32 via the interface 34.

It should be noted that even though the maritime domain awareness system 20a described herein includes the MSTT 36, in other embodiments, components other than the MSTT 36 could be used to implement various functionalities of the system 20a. However, as the MSTTs 36 are readily available off the shelf, they may provide a cost effective and efficient means for implementing the system 20a.

As shown, the MSTT 36 receives own-ship radar track data and the own-ship location value and generates MSTT supplemented radar track data. The MSTT radar track data is provided to the domain extension device 38.

The domain extension device 38 has at least one processor configured to receive the own-ship radar track data and the own-ship location value from the MSTT 36 and the own-ship AIS report from the AIS 24. In addition, the domain extension device 38 also receives other-ship radar track data and associated other-ship location values from one or more other participating vessels from the AIS modem 26. As shown, the device 38 receives other-ship radar track data and other-ship location value from vessel 11b.

The domain extension device 38 generates a common operating picture based upon the own-ship radar track data own-ship location value, other-ship radar track data and other-ship location values. The common operating picture including information about targets 12a, 12b located within the detection range 14a of the radar 22 of the vessel 11a and radars of the one or more other vessels 11b. In some embodiments, where there are duplicate targets (i.e. a target that is detected by shipboard radars of multiple vessels), a track correlator module may be implemented to associate multiple tracks associated with a same target into a single track.

The common operating picture is provided to the ECDIS 40 and a C2 Display 42. The C2 Display may include for example, visualization devices such as GlearView or Smartbiue displays by Raytheon Inc. In some embodiments, the visualization devices may be configured to toggle between displaying the entire common operating picture or just imminent threats.

This type of distributed processing is distinguishable from a system that utilizes centralized processing wherein the data from data collection ships are forwarded to a centralized location. The centralized location processes the data received from many vessels and generates a centralized operating picture, which is then sent back to the vessels. Generally, the centralized operating centre is land-based and located in a country which may be at a large geographical distance from the vessels at sea. This requires use of very long range communication devices such as satellite communication. However, satellite communication capabilities may be limited in some parts of the world. For example, satellite communication coverage in Polar Regions, such as the Northwest passage in the Arctic ocean may be limited, in addition to limitations in the communication ability, the long range communication devices may also have additional costs associated therewith to install and operating these devices on the vessels. In contrast, the embodiments described herein uses communication devices that are found in existing maritime domain awareness systems thereby providing a cost advantage.

The domain extension device 38 is also configured to transmit own-ship radar track data and own-ship location values to one or more other participating vessels (e.g. vessel 11*b*) within a communication range of the own-ship AIS transceiver, such as the AIS modem 26.

As shown in FIG. 1, the vessels 11*a* and 11*b* are within the communication range of each other. Similarly, vessels 11*b*, 11*c*, and 11*d* are within the communication range of each other and vessels 11*e* and 11*f* are also within the communication range of each other.

The AIS uses Self-Organized Time Division Multiple Access (SOTDMA) data communication technology to transmit and receive AIS broadcast reports. The AIS features 2,250 time slots per minute at two frequencies. After accounting for AIS related broadcasts, there are available timeslots that can be utilized to transmit and receive data relating to the radar system 40. However, as the number of timeslots that are available to transmit non-AIS data is limited, the domain extension device 38 in some embodiments may prioritize data that is being transmitted (or retransmitted) based upon at least one of potential threat and operational requirements. For example, priority for transmittal will be given to radar track data that is determined to be a potential threat. In another example, priority will be given to radar track data that is related to the operational requirement of vessel on which the domain extension device 38 is installed. In some embodiments, the priority may be determined at the time of transmission.

In some embodiments, the domain extension device 38 is configured to retransmit the received other-ship radar track data and the other-ship location value to another vessel. For example, the domain extension device on the vessel 11*b* may be configured to retransmit radar track data and other-ship location values associated with vessel 11*c* and 11*d* such that the vessel 11*a* is able to receive those data. This allows vessel 11*a* to generate the common operating picture that includes the targets 12*c* and 12*d* which are not within the detection range 14*a* of the radar 22.

In some embodiments, the domain extension device 38 is configured to retransmit other-ship AIS broadcasts received from other-vessels. It should be noted that the existing AIS transmits own-ship AIS broadcasts but generally does not retransmit other-ship AIS broadcasts that are received.

In some embodiments, the domain extension device 38 on each vessel 11*a*-11*f* may function as a network node in one or more self-organizing network. For example, as shown in FIG. 1, there are three networks between vessels 11*a*-11*f*. The vessels 11*a* and 11*b* are in a first network, vessels 11*b*, 11*c* and 11*d* are in a second network, and the vessels 11*e* and 11*f* are in a third network.

The networks are self-organizing in that they are formed and configured without a central authority. Furthermore, the network may be formed on an ad-hoc basis when each vessel enters the communication rage of another vessel and the vessel will leave the network when the vessel is no longer within the communication range of the other vessel.

In some embodiments, the domain extension device 38 may participate in two different types of networks. For example, the device 38 installed on a military or governmental vessel may participate in a private secure network that includes other military or governmental vessels in addition to a network that is generally available to the public. In such cases, the device 38 may interface with more than one communication device.

As shown, the maritime domain awareness system 20*a* also includes a second communication device such as a wireless modem 30 (e.g. ultrahigh frequency modems) to communicate with other selected participating domain extension devices 38 on other military or government vessels. The wireless modem 30 may be used to participate in a private network between various military or government vessels. The wireless modem 30, for example could be modems produced by Rockwell Collins or the EPLRS system produced by Raytheon. In some embodiments, the wireless modem 30 may be a SubNetRelay (SNR) modem. Like the AIS, the wire-less modem 30 may be found installed on government vessels.

The wireless modem 30 may have more bandwidth available to the domain extension device 38 in comparison to the AIS modem 26 as the AIS modem 26 is also used to transmit AIS broadcasts. This may permit more information to be sent using the wireless modem 30 in the private network.

In some embodiments, the domain extension device 38 may be configured to transmit all radar track information that are received over a period of time using the private network. In some embodiments, In contrast, due to bandwidth limitations, only priority radar track information may be transmitted using the AIS modem 26.

In some embodiments, the domain extension device 38 is configured to retransmit other-ship AIS broadcasts received from other-vessels over the private network.

In some embodiments, the domain extension device 38 may be further configured to transmit intelligence data in addition to the own-ship radar track data and on ship location values using the second communication transceiver. For example, the wireless modem track data 76 (i.e. the data received via the wireless modem 30) may include pictures, intelligence reports, and any other data that may be useful to a military or government vessel.

In some embodiments, the domain extension device 38 monitors the utilization of both of the communication devices (wireless modem 30 and AIS modem 26) to adaptively determine each channel's available capacity and determine the number and frequency of radar track data that are being transmitted. For example, the AIS modem 26 is also being used to send and receive AIS broadcasts by the AIS. As such, the capacity of the modem 26 that is available to the domain extension device 38 to transmit and receive radar track data may be vary from time to time depending on the activity of the AIS. Similarly, the wireless modem 30 may also be used by some other components on the vessel and as such the capacity available to the domain extension device 38 may also vary from time to time. The domain extension device 38 will monitor the capacity of the communication devices and adaptively determine the number and the frequency of the radar track data to be transmitted and/or received based on the available capacity. In some embodiments, the rate or frequency of transmission of radar track data associated with a target may be determined based on the relative importance of that target (e.g. potential threat, operational requirements).

In some embodiments, the domain extension devices on some of the selected participating vessels in the second type of network is further configured transmit the generated common operating picture (COP) to one or more land-based operations centres.

In some embodiments, the data transmitted between the vessels may be encrypted. For example, for military application, the data may be encrypted so as to reduce likelihood of eavesdropping. In such cases, at least one of the communication transceiver and the domain extension device is further configured to decrypt encrypted other-ship radar track data and other-ship location values when such information is received using the second communication transceiver. At least one of the communication transceiver and the domain extension device is further configured to encrypt own-ship radar-track data and other-ship location values prior to transmitting those information to the one or more other vessels using the second communication transceiver.

Figure 2:
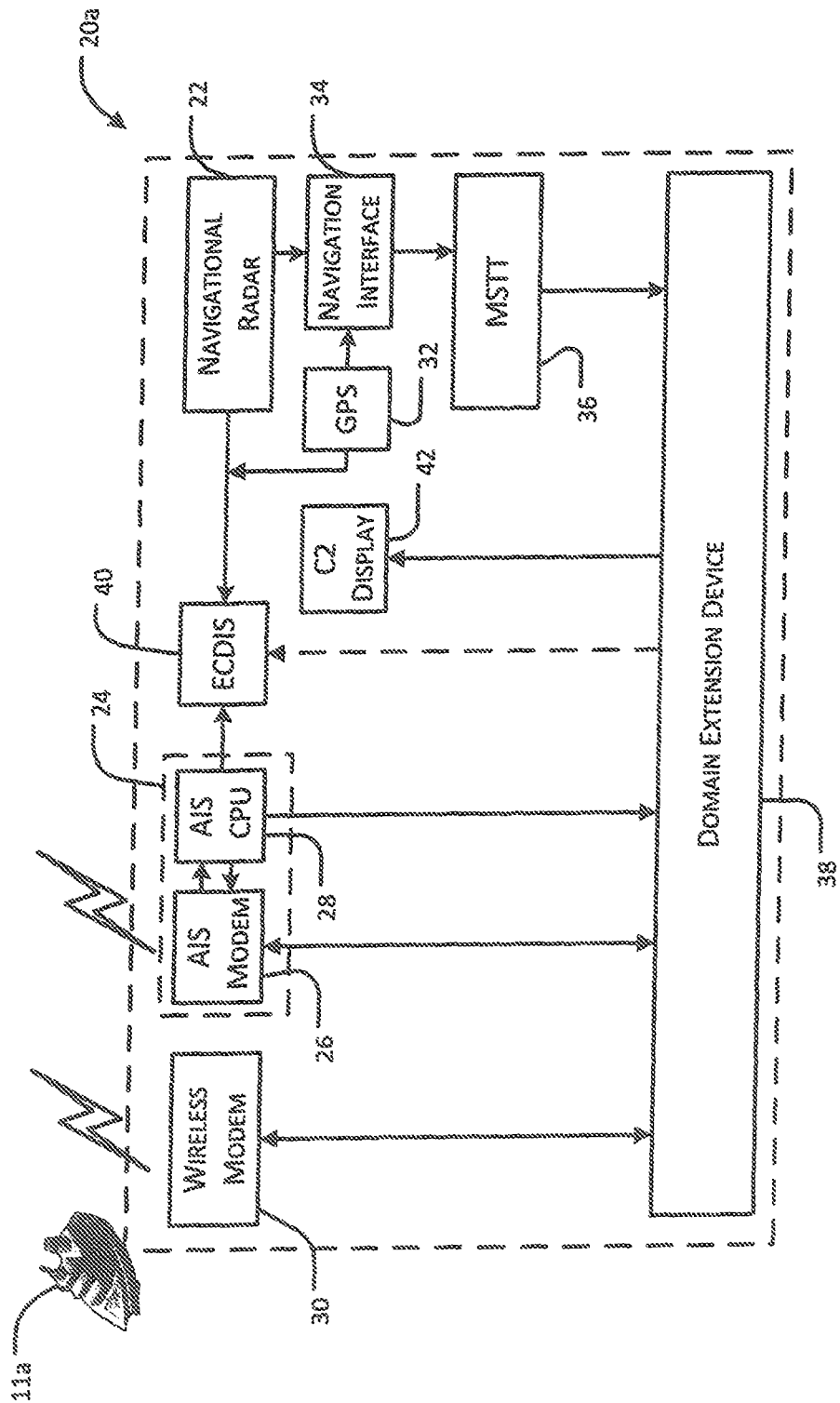
FIG. 2 is a schematic diagram illustrating a maritime domain awareness system featuring a device for distributing radar track data according to some embodiments found on one of the vessels shown in FIG. 1.
Figure 3:
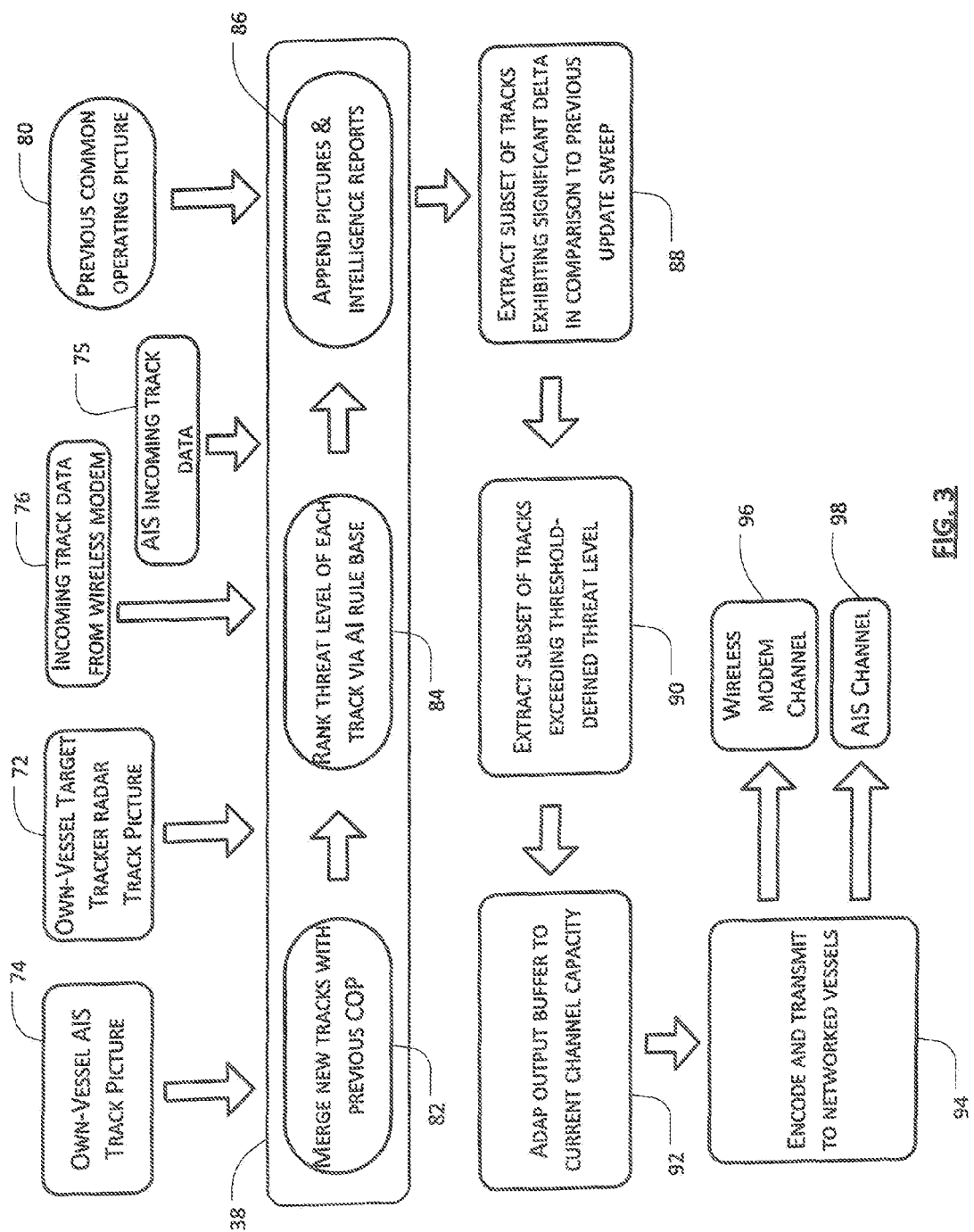
FIG. 3 is a schematic diagram illustrating some exemplary data received from various components of the system shown in FIG. 2 and how such data may be processed by the device for distributing radar track data according to some embodiments.

Referring now to FIG. 3, illustrated are some exemplary data received from various components of the system 20*a* shown in FIG. 2 and how such data may be processed by the domain extension device 38 according to some embodiments.

As shown, own-vessel AIS track picture 74, own-vessel target tracker radar track picture 72, wireless-modem incoming track data 76, AIS incoming track data 75 are provided to the domain extension device 38.

The radar track distributing device 38 processes various information 72, 74, 76, 76 to generate a common operating picture. The radar track distributing device 38 may also have a previously generated common operating picture, 80. In such cases, the previously generated common operating picture may be updated as necessary to reflect the latest data received from various sources. Some steps that can be taken to generate a current common operating picture from various information 72, 74, 75, 76, 80 according to some embodiments are described herein below. In some cases, the domain extension device 38 may execute one or more of the steps described herein.

At step 82 new tracks from the own-vessel AIS track picture generated by the shipboard AIS are merged with the previously generated common operating picture.

At step 84, the threat level of each track is determined. This may be accomplished by providing a set of artificial intelligence rules to generate a threat level value based on some characteristics of the track.

At step 86, the pictures and intelligence from the received information 72, 74, 76, 76 are appended to the previously generated common operating picture 80 to generate the current common operating picture.

In some embodiments, only a subset of the information 72, 74, 75, 76 from various sources may be transmitted to other vessels. The subset to be transmitted could be selected based on various criteria. Exemplary steps that can be taken to select subsets of tracks to be transmitted according to some embodiments are described as follows.

At step 88, a first subset of tracks is selected based on how much those tracks have changed in the current operating picture in comparison to the previously generated common operating picture 80.

At step 90, a second subset of tracks is selected based upon whether those tracks exceed a given threat level.

After the subsets of tracks for transmittal are selected, the radar system 40 transmits the selected data to other vessels either through a wireless modem or a AIS transponder, or both at steps 92, 94, 96 and 98.

It should be noted that while the above description notes use of the domain extension device 38 in conjunction with existing maritime domain awareness systems on various vessels, the domain extension device 38 in some embodiments may also be installed on land-based maritime domain awareness systems. For example, the domain extension device 38 may interface with existing maritime domain awareness systems in vehicle traffic services (VTS) of various ports harbours and so on to extend domain awareness of such systems.

Figure 4:
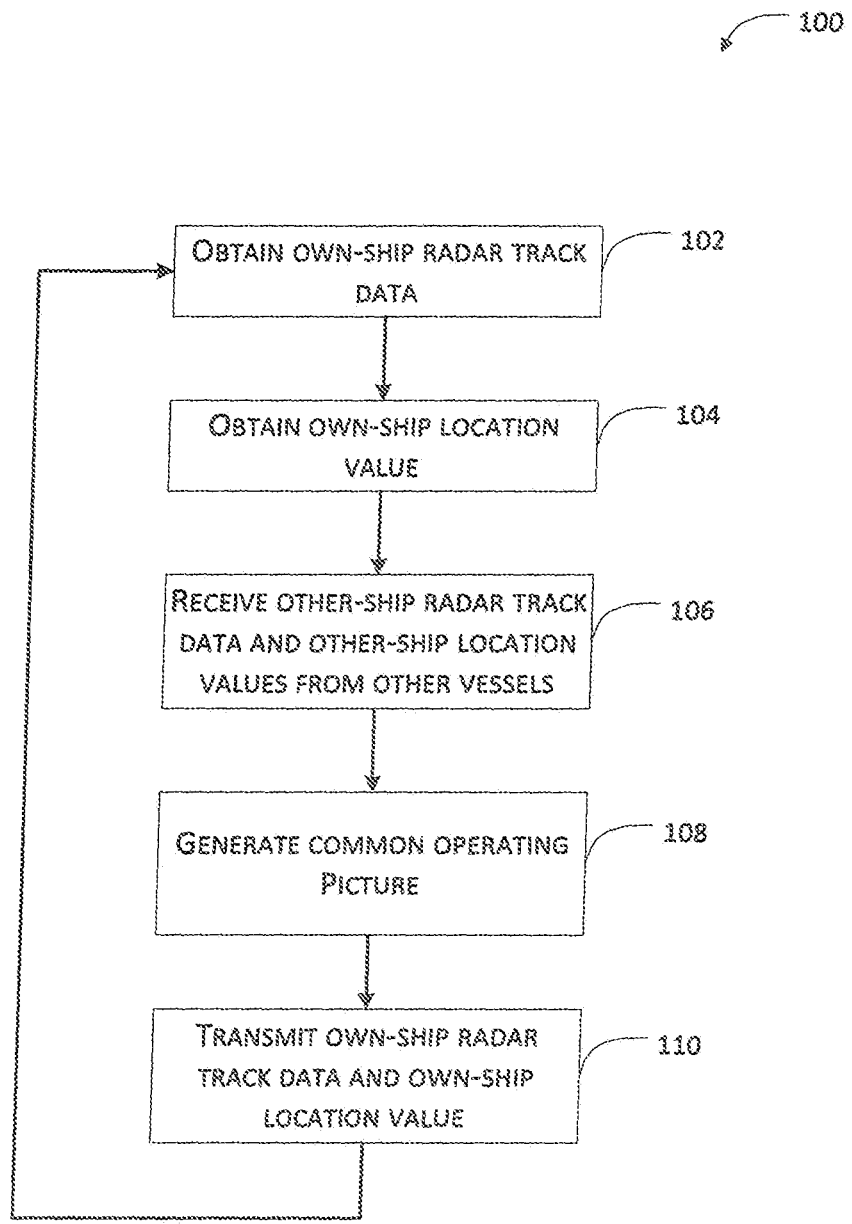
FIG. 4 is a flow chart illustrating a method for distributing radar track data according some other embodiments.

Referring now to FIG. 4, illustrated therein is a method 100 for distributing radar track data between participating vessels having a shipboard navigational radar, an Automatic identification System (AIS) and a positioning device installed thereon on each of the vessels. In some embodiments, a domain extension device having a processor may be configured to execute one or more of the steps of the method 100 to distribute radar track data between vessels to extend domain awareness of the vessels. In some embodiments, one or more of the steps in the method may be executed by one or more devices on the vessels.

The method begins at step 102 in which, own-ship radar track data is received from the navigational radar. The own-ship radar track data is associated with detectable targets located within a detection range of the radar.

At step 104, own-ship location value from the positioning device is received. The location value is indicative of a geographical location of the vessel when the own-ship radar track data is generated.

At step 106, a AIS transceiver of a AIS is sued to receive other-ship radar track data and associated other-ship location values from one or more other participating vessels within a communication range of other-ship AIS transceivers.

At step 108, a common operating picture based upon the own-ship radar track data, own-ship location value, common operating picture includes information about targets located within the detection range of the radar of the vessel and radars of the one or more other vessels.

At step 110, the AIS receiver is used to transmit own-ship radar track data and own-ship location values to one or more other participating vessels within a communication range of the own-ship AIS transceiver.

After step 110, the method 100 returns to step 102 to re-execute the steps to obtain an updated common operating picture.

It should be understood that one or more of the steps herein above need not be executed in the order as described. For example, it may be possible to execute some steps in parallel or to execute some steps in a different order.

While the above description provides examples of one or more apparatus, methods, or systems, it will be appreciated that other apparatus, methods, or systems may be within the scope of the present description as interpreted by one of skill in the art.

The invention claimed is:

1. A system for extending maritime domain awareness of participating vessels, each of the vessels having a shipboard navigational radar, an Automatic Identification System (AIS) having an AIS transceiver, and a positioning device installed thereon, the system comprising a domain extension device installed on each of the vessels, the domain extension device comprising at least one processor operatively coupled to the radar, the AIS and the positioning device, the at least one processor being configured to:
   (a) receive own-ship radar track data from the navigational radar indicative of detectable targets located within a detection range of the radar;
   (b) receive own-ship location values from the positioning device indicative of a geographical location of the vessel when the radar track data is generated;
   (c) interface with the AIS transceiver to receive other-ship radar track data and associated other-ship location values from one or more other participating vessels within a communication range of other-ship AIS transceivers;
   (d) generate a common operating picture based upon the own-ship radar track data, own-ship location value, other-ship radar track data and other-ship location values, the common operating picture including information about targets located within the detection range of the radar of the vessel and radars of the one or more other vessels; and
   (e) interface with the AIS transceiver to transmit own-ship radar track data and own-ship location values to one or more other participating vessels within a communication range of the own-ship AIS transceiver.

2. The system of claim 1, further comprising at least one communication transceiver in addition to the AIS transceiver, the communication transceiver operatively coupled to the domain extension device, the at least one processor of which is further configured to:
   (a) receive the other-ship radar track data and the other-ship location values using the communication transceiver from one or more other selected participating vessels within a communication range of other-ship compatible communication devices installed on the selected participating vessels; and
   (b) transmit own-ship radar track data and own-ship location values using the communication transceiver to one or more other selected participating vessels within a communication range of the own-ship communication transceiver.

3. The system of claim 2, wherein the communication transceiver includes a wireless modem adapted to form a private network.

4. The system of claim 2, wherein at least one of the communication transceiver and the domain extension device is further configured to:
   (a) decrypt encrypted other-ship radar track data and other-ship location values when such information is received using the communication transceiver; and
   (b) encrypt own-ship radar-track data and other-ship location values prior to transmitting those information to the one or more other vessels using the communication transceiver.

5. The system of claim 4, wherein the domain extension device is further configured to transmit intelligence data in addition to the own-ship radar track data and own ship location values using the communication transceiver.

6. The system of claim 4, wherein the domain extension device is further configured to receive intelligence data in addition to the own-ship radar track data and own ship location values using the communication transceiver.

7. The system of claim 1, wherein the domain extension device on each participating vessel is configured to form one or more self-organizing networks with other domain extension devices on other participating vessels that are within the communication range of the AIS transceivers.

8. The system of claim 7, wherein the self-organizing network is an ad-hoc self-configuring network.

9. The system of claim 2, wherein the domain extension device on each selected participating vessel is configured to form one or more private self-organizing networks with other domain extension devices on other selected participating vessels that are within the communication range of the communication transceivers.

10. The system of claim 9, wherein the domain extension devices on some of the selected participating vessels are further configured to transmit the generated common operating picture to one or more operations centres.

11. The system of claim 1, wherein the domain extension device is further configured to:
   (a) receive own-ship AIS data, the AIS data being generated by the AIS installed on a vessel and including identification and navigation information about that vessel;
   (b) receive other-ship AIS data from one or more other vessels using the AIS transponder;
   (c) include the own ship AIS data and the other-ship AIS data when generating the common operating picture; and
   (d) transmit the own-ship AIS data and the other-ship AIS data using the AIS transponder.

12. The system of claim 1, wherein the domain extension device is further configured to retransmit the received other-ship radar track data and the other-ship location values.

13. The system of claim 12, wherein the own-ship radar track data, own-ship location value, other-ship radar track data and other-ship location values are prioritized for retransmission based upon at least one of potential threat associated with a target and operational requirements of the participating vessel.

14. The system of claim 13, wherein a frequency of transmission of at least one of the own-ship radar track data, own-ship location value, other-ship radar track data and other-ship location values are determined based upon the relative importance of that information.

15. The system of claim 2, wherein the domain extension device is further configured to monitor available capacity of at least one of the AIS transceiver and the communication transceiver, and adjust at least one of a frequency of transmission of own-ship radar track data and a number of own-ship radar track data that is being transmitted.

16. A domain extension device installable on a participating vessel having a shipboard navigational radar, an Automatic identification System (AIS) having an AIS transceiver, and a positioning device, the domain extension device comprising at least one processor configured to:
   (a) receive own-ship radar track data from the navigational radar indicative of detectable targets located within a detection range of the radar;
   (b) receive own-ship location value from the positioning device indicative of a geographical location of the vessel when the radar track data is generated;
   (c) interface with the AIS transceiver to receive other-ship radar track data and associated other-ship location values from one or more other participating vessels within a communication range of other-ship AIS transceivers;

(d) generate a common operating picture based upon the own-ship radar track data, own-ship location value, other-ship radar track data and other-ship location values, the common operating picture including information about targets located within the detection range of the radar of the vessel and radars of the one or more other vessels; and (e) interface with the AIS transceiver to transmit own-ship radar track data and own-ship location values to one or more other participating vessels within a communication range of the own-ship AIS transceiver.

17. A domain extension device comprising at least one processor configured to:

(a) receive own-ship radar track data from a navigational radar indicative of detectable targets located within a detection range of the radar;

(b) receive own-ship location values from a positioning device indicative of a geographical location of the vessel when the radar track data is generated;

(c) receive other-ship radar track data and associated other-ship location values using a shipboard transceiver, the other-ship radar track data and associated other ship location values being from one or more other participating vessels within a communication range of other-ship transceivers;

(d) generate a common operating picture based upon the own-ship radar track data, own-ship location value, other-ship radar track data and other-ship location values, the common operating picture including information about targets located within the detection range of the radar of the vessel and radars of the one or more other vessels; and (e) transmit own-ship radar track data and own-ship location values using the shipboard transceiver to one or more other participating vessels within a communication range of the shipboard transceiver.

18. A method for extending maritime domain awareness of participating vessels, each of the vessels having a shipboard navigational radar, an Automatic Identification System (AIS) and a positioning device installed thereon, the method comprising:

(a) receiving own-ship radar track data from the navigational radar indicative of detectable targets located within a detection range of the radar;

(b) receive own-ship location value from the positioning device indicative of a geographical location of the vessel when the radar track data is generated;

(c) interface with the AIS transceiver to receive other-ship radar track data and associated other-ship location values from one or more other participating vessels within a communication range of other-ship AIS transceivers;

(d) generate a common operating picture based upon the own-ship radar track data, own-ship location value, other-ship radar track data and other-ship location values, the common operating picture including information about targets located within the detection range of the radar of the vessel and radars of the one or more other vessels; and (e) interface with the AIS transceiver to transmit own-ship radar track data and own-ship location values to one or more other participating vessels within a communication range of the own-ship AIS transceiver.

19. The method of claim 18, further comprising:

(a) receiving the other-ship radar track data and the other-ship location values using a communication transceiver in addition to the AIS transceiver, the other-ship radar track data and the other-ship location values being received from one or more other selected participating vessels within a communication range of other-ship compatible communication devices installed on the selected participating vessels; and (b) transmitting own-ship radar track data and own-ship location values using the communication transceiver to one or more other selected participating vessels within a communication range of the own-ship communication transceiver.

20. The method of claim 19, further comprising:

(a) decrypting at least one of the received other-ship radar track data and other-ship location values when such information is received in an encrypted format; and (b) encrypting at least one of own-ship radar-track data and other-ship location values prior to transmitting those information.

21. The method of claim 19, further comprising transmitting intelligence data in addition to the own-ship radar track data and own ship location values using the communication transceiver.

22. The method of claim 19, further comprising receiving intelligence data in addition to the own-ship radar track data and own ship location values using the communication transceiver.

23. The method of claim 18, further comprising forming one or more self-organizing networks with other domain extension devices on other participating vessels that are within the communication range of the AIS transceivers.

24. The method of claim 23, wherein the self-organizing network is an ad-hoc self-configuring network.

25. The method of claim 19, further comprising forming one or more private self-organizing networks with other domain extension devices on other selected participating vessels that are within the communication range of the communication transceivers.

26. The method of claim 18, further comprising receiving from and transmitting to one or more land-based operating centers at least one of: the own-ship radar track data, the own-ship location values, the other-ship radar track data, the other-ship locations values, and the generated common operating picture.

27. The method of claim 18, further comprising:

(a) receiving own-ship AIS data, the AIS data being generated by the AIS installed on a vessel and including identification and navigation information about that vessel;

(b) receiving other-ship AIS data from one or more other vessels using the AIS transponder;

(c) including the own ship AIS data and the other-ship AIS data when generating the common operating picture; and (d) transmitting the own-ship AIS data and the other-ship AIS data using the AIS transponder.

28. The method of claim 18, further comprising retransmitting the received other-ship radar track data and the other-ship location values.

29. The method of claim 28, further comprising prioritizing the retransmission of the own-ship radar track data, the own-ship location value, the other-ship radar track data and the other-ship location values based upon at least one of threat associated with a target and operational requirements of the participating vessel.

30. The method of claim 29, further comprising determining how often the own-ship radar track data, the own-ship location value, the other-ship radar track data and the other-ship location values are transmitted based upon the relative importance of that information.

31. The method of claim 19, further comprising monitoring available capacity of at least one of the AIS transceiver and the communication transceiver, and adjusting at least one of how often the own-ship radar track data is being transmitted and amount of own-ship radar track data that is being transmitted.

\* \* \* \* \*